United States Patent
Neugebauer et al.

(10) Patent No.: US 9,575,948 B2
(45) Date of Patent: Feb. 21, 2017

(54) ANNOTATION OF DIGITAL CONTENT VIA SELECTIVE FIXED FORMATTING

(71) Applicant: NOOK DIGITAL, LLC, New York, NY (US)

(72) Inventors: Charles Neugebauer, Los Altos, CA (US); Matthew Pallakoff, Mountain View, CA (US); Luis D. Mosquera, Foster City, CA (US)

(73) Assignee: Nook Digital, LLC, New York, NY (US)

( * ) Notice: Subject to any disclaimer, the term of this patent is extended or adjusted under 35 U.S.C. 154(b) by 491 days.

(21) Appl. No.: 14/046,564

(22) Filed: Oct. 4, 2013

(65) Prior Publication Data

US 2015/0100876 A1   Apr. 9, 2015

(51) Int. Cl.
*G06F 17/21*   (2006.01)
*G06F 17/24*   (2006.01)
(Continued)

(52) U.S. Cl.
CPC ........... *G06F 17/241* (2013.01); *G06F 3/0483* (2013.01); *G06F 3/0488* (2013.01); *G06F 17/242* (2013.01); *G06F 2200/1614* (2013.01)

(58) Field of Classification Search
CPC ..... G06F 17/211; G06F 17/241; G06F 3/0488
See application file for complete search history.

(56) References Cited

U.S. PATENT DOCUMENTS 4,896,543 A    1/1990  Gullman
5,625,833 A *  4/1997  Levine ................... G06F 3/033
                                                    715/203

(Continued)

FOREIGN PATENT DOCUMENTS

EP   0722150 A1   7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Stephen Hong
*Assistant Examiner* — Broderick Anderson
(74) *Attorney, Agent, or Firm* — Finch & Maloney PLLC

(57) ABSTRACT

Techniques are disclosed for providing a fixed format viewing mode in electronic computing devices. The fixed format viewing mode may be engaged upon receiving virtual ink annotations at the touch screen of the electronic device. The annotations may be input using an active stylus. Upon receiving virtual ink annotations, the current page of digital content may be converted into a fixed format page wherein the formatting characteristics are held constant and the annotations remain in the same location with respect to the underlying digital content. Formatting characteristics for other pages of the digital content may be altered, however the fixed format page maintains the same format as when the annotations were added. The user may hide and/or edit virtual ink annotations, and when the annotations are hidden the content of the fixed format page may flow normally and match the formatting characteristics of the rest of the digital content.

20 Claims, 16 Drawing Sheets

(51) Int. Cl.
G06F 3/0488 (2013.01)
G06F 3/0483 (2013.01)

(56) References Cited

U.S. PATENT DOCUMENTS

| | | | |
|---|---|---|---|
| 5,633,471 A | 5/1997 | Fukushima | |
| 5,844,557 A | 12/1998 | Shively, II | |
| 6,259,438 B1 | 7/2001 | Fleck et al. | |
| 6,687,876 B1* | 2/2004 | Schilit | G06F 17/241 715/231 |
| 6,956,564 B1 | 10/2005 | Williams | |
| 7,016,963 B1* | 3/2006 | Judd | G06F 17/30905 707/E17.121 |
| 7,028,267 B1* | 4/2006 | Beezer | G06F 17/241 715/802 |
| 7,337,389 B1* | 2/2008 | Woolf | G06F 17/241 345/629 |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2004/0255179 A1* | 12/2004 | Mayer | G06F 9/4406 714/1 |
| 2007/0047002 A1 | 3/2007 | Hull et al. | |
| 2008/0036747 A1 | 2/2008 | Hope | |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0173657 A1* | 7/2012 | Ozzie | G06F 9/44526 709/217 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may-use-acoustic-commands.html,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchless-gestures/, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm. PST, MacRumors—news and rumors you care about, http://www.macrumors.com/2012/01/23/multi-touch-page-flipping-ebook-concept-shown-on-an-ipad/, 6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2_p9162c1577d94.html., 4 pages, printed from the Internet on May 10, 2013.

(56) References Cited

OTHER PUBLICATIONS

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-input/, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," Brando—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, http://www.paia.com/ProdArticles/touchsw.html, 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=1439369, 1 page, printed from the Internet on Jan. 15, 2013.
Stern, Joanna, "A closer look at the HTC Flyer's screen, stylus, and Scribe," http://www.engadget.com/2011/02/15/a-closer-look-at-the-htc-flyers-screen-and-stylus-aka-htc-scri/, 14 pages, printed from the Internet on Sep. 30, 2013. Please see video accompanying the article.
Hoffelder, Nate, "First look at Kobo's new note taking ability," The Digital Reader, http://www.the-digital-reader.com/2011/05/18/first-look-at-kobos-new-note-taking-ability/, 5 pages, printed from the Internet on Sep. 30, 2013. Please see the video accompanying the article at the 5:40 mark.
Cohen, Peter, "OS X Mavericks preview: iBooks," http://www.imore.com/mavericks-preview-ibooks, 6 pages, posted on the internet on Jul. 2, 2013.

* cited by examiner

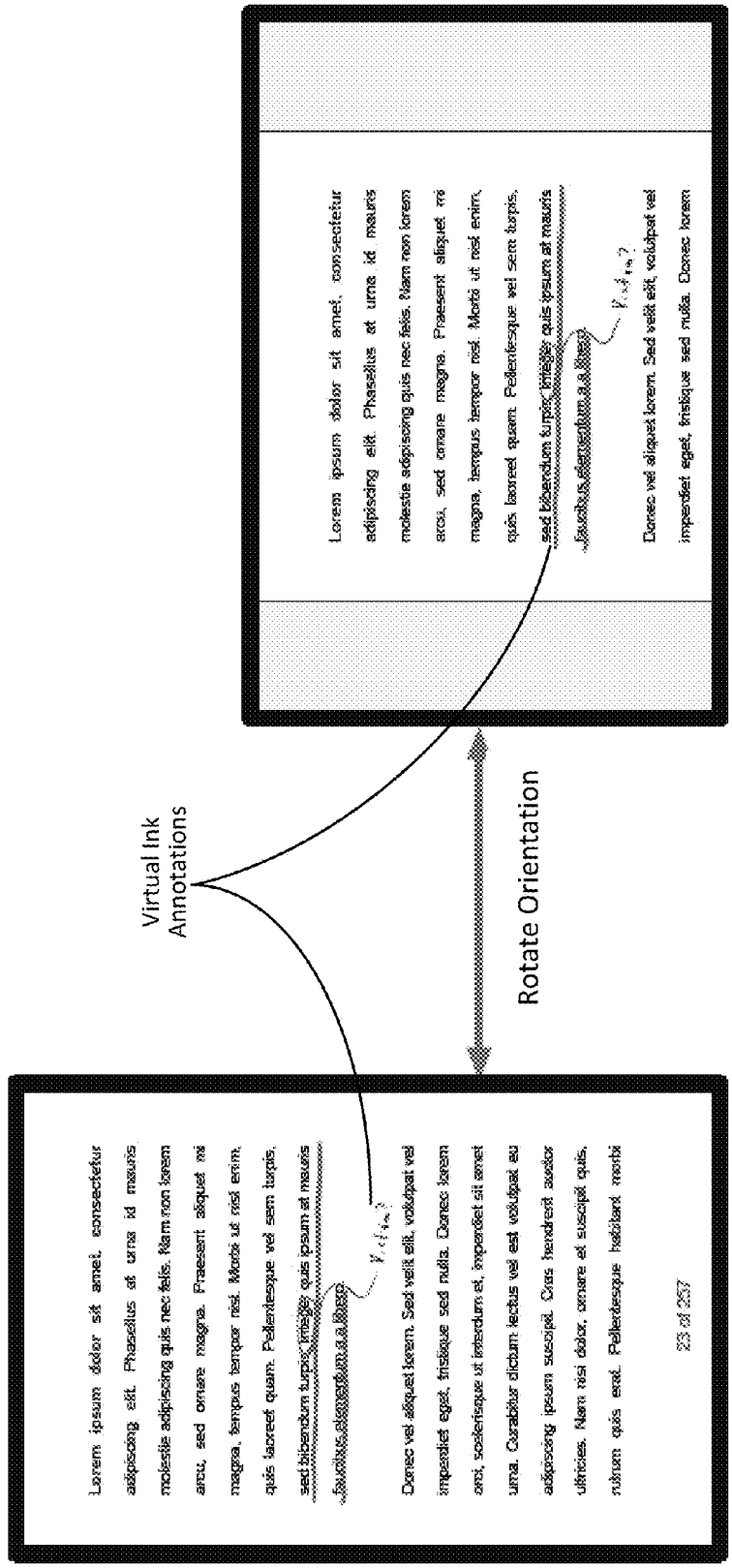

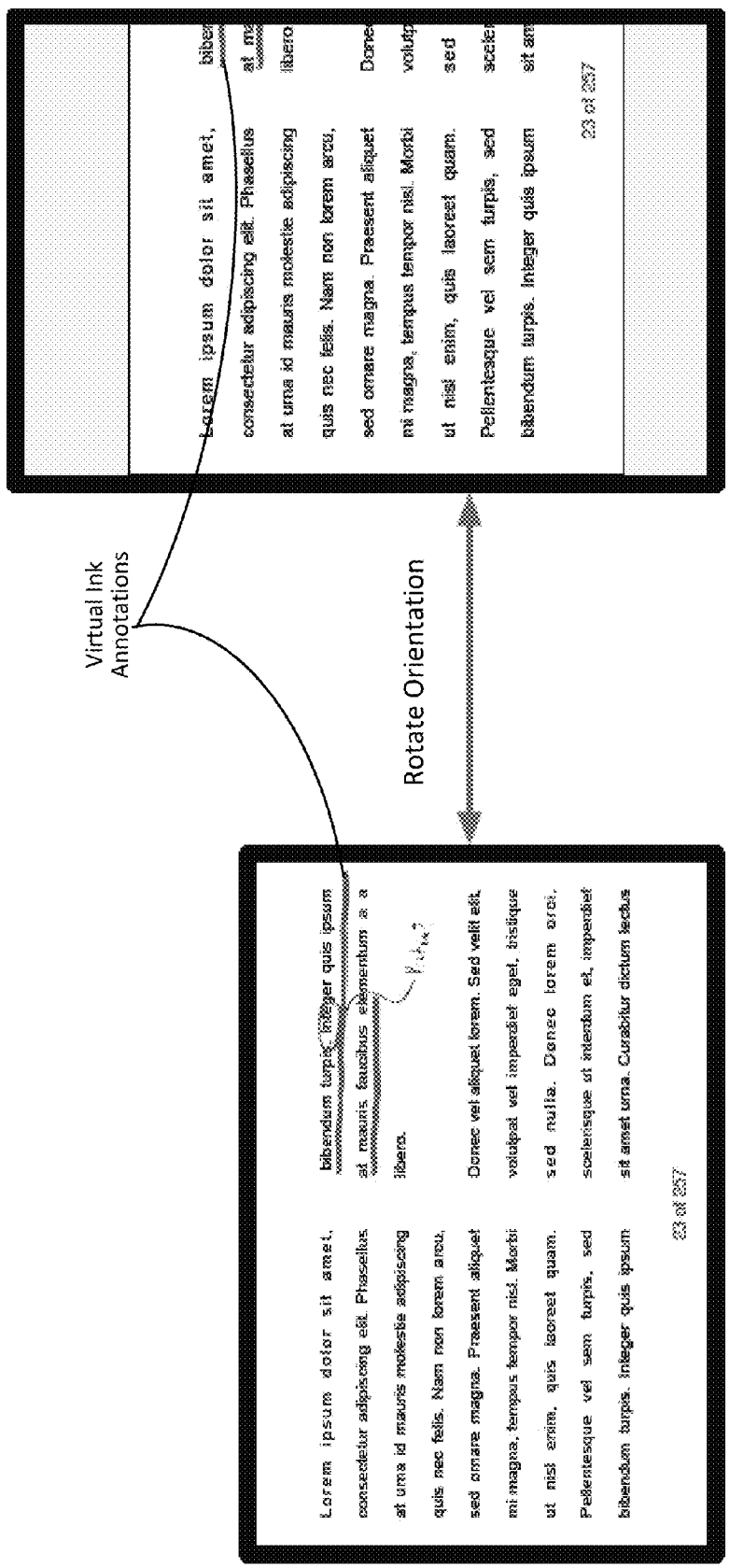

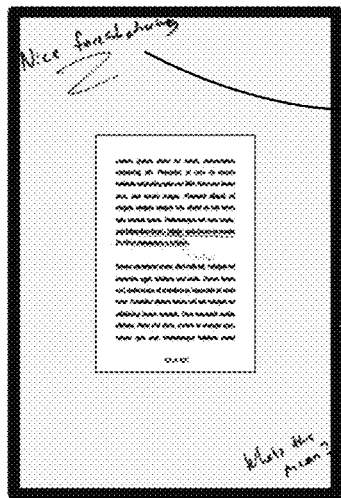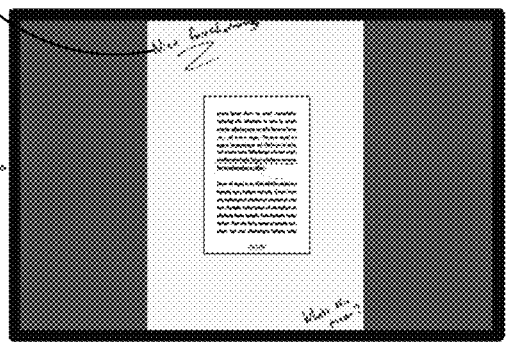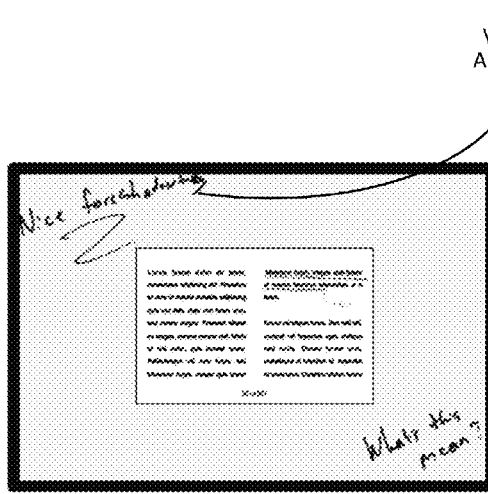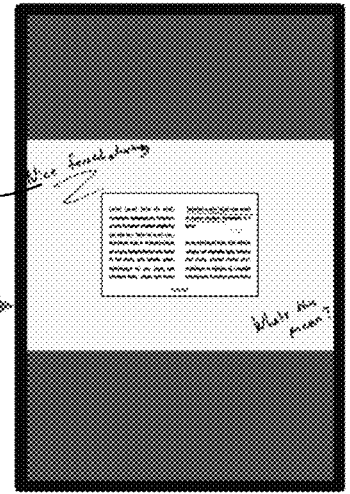
Fig. 10a
Fig. 10b
Fig. 10c
Fig. 10d

ANNOTATION OF DIGITAL CONTENT VIA SELECTIVE FIXED FORMATTING

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive and stylus sensitive surfaces, such as a track pad (e.g., capacitive or resistive touch sensor) or contact sensitive housing (e.g., acoustic sensor).

BRIEF DESCRIPTION OF THE DRAWINGS

FIGS. 8a-b illustrate an example fixed format viewing mode that can be applied to a touch sensitive electronic device, in accordance with an embodiment of the present invention.

FIGS. 9a-b illustrate another example fixed format viewing mode that can be applied to a touch sensitive electronic device, in accordance with an embodiment of the present invention.

FIGS. 10a-d illustrate additional examples of a fixed format viewing mode with extended margins that can be applied to a touch sensitive electronic device, in accordance with embodiments of the present invention.

DETAILED DESCRIPTION

Figure 1A:
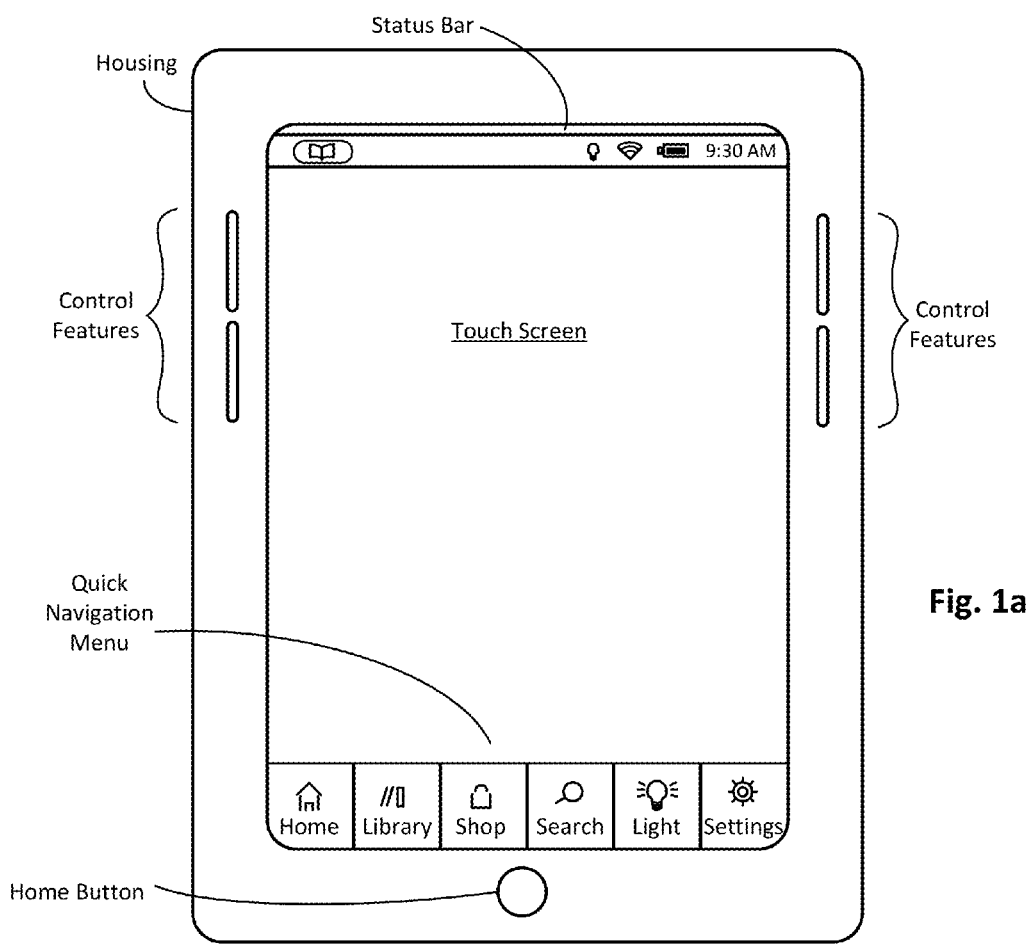
FIGS. 1a-b illustrate an example electronic touch screen device having a fixed format viewing mode configured in accordance with an embodiment of the present invention.

Techniques are disclosed for providing a fixed format viewing mode in electronic computing devices, such as a touch screen device. The fixed format viewing mode may be engaged upon receiving virtual ink annotations at the touch screen of the electronic device. The annotations may be input using, for instance, a stylus or user's finger. Upon receiving virtual ink annotations, the current page of digital content may be converted into a fixed format page wherein the formatting characteristics of that particular page are held constant and the annotations remain in a constant location with respect to the underlying digital content. Formatting characteristics for other pages of the digital content may be altered and otherwise remain flowable; however, the fixed format page maintains the same "fixed" format as when the annotations were added. Formatting characteristics that may be changed include, for example, font, font size, font color, background color, background shading, line spacing, margin spacing, etc. In some cases, the margins may change if the electronic device's orientation is changed, or if digital content is transferred to a device having different screen dimensions. The user may hide and/or edit virtual ink annotations, and when the annotations are hidden the content of the fixed format page may flow normally and match the formatting characteristics of the rest of the digital content. If the annotations are unhidden, or displayed again, the digital content reverts back to the fixed format mode. Annotations may be shown and/or hidden by selecting a menu option, or by selecting a stylus icon that may be displayed on any page having virtual ink annotations or in an actions bar along with other eReader tools. The stylus icon may be displayed on any page with annotations whether or not those annotations are hidden from view.

General Overview

As previously explained, electronic display devices such as tablets, eReaders, and smart phones are commonly used for displaying user interfaces and consumable content. The user of such devices can typically consume the displayed content with relative ease. In some instances, the user may wish to add notes, comments, or other annotations to digital content using, for example, a stylus. After adding virtual-ink annotations to a piece of content, the user may further wish to adjust content viewing settings, such as font, font size, in some embodiments. When text formats are changed (e.g., font size, font, background color, background shading, font color, line spacing, margin spacing, switching from landscape to portrait mode or back), the text normally reflows in a non-fixed format. The flowable digital content could be a file formatted as, for example, an ePub, iBook, .lit, or any other suitable file format for presenting flowable digital content on a touch screen device. As a result of this reflow process, the various annotations inevitably get mangled or separated from their intended positions in the text, or the annotations are merely hidden from view when formatting changes are made. While general functions suitable for annotating content and adjusting font size may be available in some electronic devices, a selectively applied fixed format viewing mode as described herein may provide a more intuitive or otherwise positive user experience.

Thus, and in accordance with an embodiment of the present invention, a fixed format viewing mode is disclosed for use in electronic touch screen devices. When viewing content on an electronic device, such as a tablet or eReader, text and other content may be displayed to the user in a flowable format, such that when the font size, margins, or other content characteristics are changed the content may be reorganized and the pages renumbered. In one embodiment, underlining, circling, highlighting, or adding comments between the lines of content or in the margins will create a fixed format page so that the annotations on that page will remain in their original position with respect to the underlying content. In one such example, the moment a user writes any virtual ink annotations on a flowable format page, the "inked" version of that page becomes fixed, such that if the user then changes text format in any way that would normally cause the text to reflow, the pages with virtual ink annotations will stay fixed and the annotations will appear in-line with the text (i.e. connected with the underlying content being annotated). Note, however, that text on pages without ink will reflow normally. After the page format has been fixed, text selection, lookup, and other standard actions may still be available to the user, in some embodiments. Margin adjustments to digital content may occur, for example, from changing the orientation of a device from landscape to portrait mode, or vice versa, or transferring content from one device to another device having different display dimensions. In some embodiments, the user may be able to enable or disable the fixed format viewing mode for all books, for specific books, or for specific genres of books. For example, a user who never annotates romance novels and simply wishes to read quickly through such book may disable the annotation and fixed format viewing mode for books of that genre.

In some embodiments, once virtual ink has been added to digital content, the user can flip through the pages in the selective fixed format viewing mode with annotations visible inline (so that the user sees them while flipping through the book or viewing a visual table of contents), or with the annotations hidden so that the pages flow normally. The techniques disclosed herein are distinct from technologies that allow written annotations on eBooks but force the user to hide annotations when changes are made to the text font size or other formatting options. In such cases, changing formatting options after adding annotations to a page will automatically hide the annotations until the document has returned to the formatting settings in place when the annotations were made. In contrast, the techniques described herein allow users to change various formatting settings without hiding handwritten annotations throughout the eBook. With the techniques described herein, a page of digital content (e.g., an ePub page) with unhidden handwritten annotations stays fixed in the format it had when the first handwritten mark was made on that page, while other pages without handwritten annotations reflect the current text format settings. The user has the option to hide handwritten annotations, which will make all pages (including those with handwritten annotations) reflect the current text format settings—but the user is not required to hide handwritten annotations every time a change is made to the text format settings, in some embodiments. While viewing content with annotations hidden, the pages showing text with associated ink may include, for example, a stylus icon (or other annotations icon), indicating that this page has ink notes associated with it, and the user can engage the icon with a stylus or finger tap, in one embodiment. The stylus icon may be, for example, grayed out, partially transparent, and/or having some depth to it so that it looks "tappable," in some embodiments. The stylus icon may function to show annotations when they are hidden, or to hide annotations when they are visible, and the user may switch back and forth between the fixed format viewing mode showing annotations and the standard flowable text format by tapping the stylus icon multiple times, in some embodiments. Selecting the stylus icon while the annotations are hidden may revert the page back to the fixed format as it appeared when the annotations were added (i.e., same font size, font, line spacing, margins, etc.). In one embodiment, the stylus icon may appear on the page whether or not the ink notes are currently hidden, so that if the user has made any (perhaps inadvertent and difficult to see) annotations or marks on the page, the icon will indicate that the page has some ink on it and the user will have the ability to clear the ink. Such a feature may be important because even a tiny bit of ink on a page can dramatically affect how the page behaves and whether or not the font size may be altered, for example. In other embodiments, the stylus icon (or other suitable indicator) may be one option in an actions bar along with other eReader tools, and the actions bar may be hidden or displayed in response to a user gesture. In one embodiment, if a user begins making ink annotations on a page that has pre-existing annotations hidden, the page format may revert to the previous fixed format mode in order to display the earlier annotations and allow additional note-taking.

In another embodiment, selecting the stylus icon may display a number of UI elements that allow the user to select an action, such as hide annotations, show annotations, clear annotations on this page, clear all annotations, etc. In one specific example, the UI element may include a bit of text explaining the associated action. For example, the hide annotations option may include a textual hint of "hiding notes allows the text to flow normally if you alter the format." In some cases, hiding and/or showing virtual ink annotations may be performed separately from editing traditional highlights, typed notes, or bookmarks. The hide/show annotations option may be engaged, for example, through a standard eReader settings menu, and in some cases a universal "hide all annotations" option may be available to hide all notes, highlights, bookmarks, virtual ink annotations, etc. If the user selects the UI element to clear all annotations or clear annotations on the current page, a confirmation alert may be displayed in order to confirm whether the user wants to clear all virtual ink annotations throughout the eBook or on the current page. If the user confirms the action, the virtual ink annotations may be cleared and if the page is not already being displayed at the user's current formatting settings, then the pages may be reformatted to reflect that the page is no longer in the fixed format mode. Alternatively, the UI element may clear traditional highlights, typed notes, as well as virtual ink annotations. Multiple options may be available in the settings menu to allow the user to, for example, edit virtual ink annotations separately from typical typed notes and/or text highlights. The ability to edit, hide, and view ink notes separately may be desirable in order to see the content flow normally without interruptions when text format changes have resulted in combinations of flowing content pages and fixed format mages with in annotations. Hiding or showing virtual ink annotations may be accompanied, in some embodiments, by a graphic or animation that assists users in keeping their place while the text formatting is being adjusted. Such animations provide a more intuitive reading experience and may be user configured or hard-coded, in some embodiments.

In one embodiment, if the user is viewing a flowable format page adjacent to a fixed format page, some redundant text may be present as a result of any formatting changes performed on the flowable format pages. In such cases, the redundant text may be shaded out or otherwise hidden, or a page curl graphic may cover a portion of the page in order to indicate to users that they should continue to the next page in order to read the content with the virtual ink annotations displayed. In a more general sense, redundant text is effectively identified to the user.

Architecture

Figure 1B:
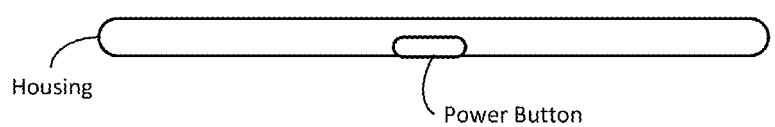

FIGS. 1a-b illustrate an example electronic touch sensitive device having a fixed format viewing mode configured in accordance with an embodiment of the present invention. As can be seen, in this example embodiment, the touch sensitive surface is a touch screen display capable of detecting direct or sufficiently proximate contact by a user's hand, a stylus, or any other suitable implement. The device could be, for example, a tablet such as the NOOK® tablet or eReader by Barnes & Noble. In a more general sense, the device may be any electronic device having a touch sensitive user interface for detecting user contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
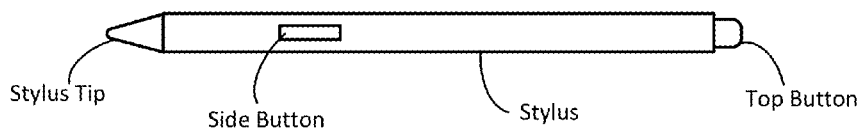
FIG. 1c illustrates an example stylus for use with an electronic computing device, configured in accordance with an embodiment of the present invention.

FIG. 1c illustrates an example stylus for use with an electronic computing device configured in accordance with an embodiment of the present invention. As can be seen, in this particular configuration, the stylus comprises a stylus tip used to interact with a stylus detection surface or touch screen display (by either direct contact or hover over interaction, or otherwise sufficiently proximate indirect contact) and control features including a top button and a side button along the shaft of the stylus. In this example, the stylus tip has a rounded triangular shape, while in alternative embodiments the stylus tip may be more rounded, or any other suitable shape. The stylus tip may be made of any number of materials of different textures and firmness depending on the needs of the specific device. The stylus may include fewer or additional control features than the top and side buttons illustrated in FIG. 1c, or different control features altogether. Such control features may include, for example, a rotating knob, a switch, a sliding control bar, or other suitable control features that will be apparent in light of this disclosure. The stylus may be an active or passive stylus, or any other suitable implement for interacting with the device and creating virtual ink annotations, thus triggering the fixed format viewing mode described herein. As will be appreciated, the claimed invention is not intended to be limited to any particular kind or type of stylus.

Figure 1D:
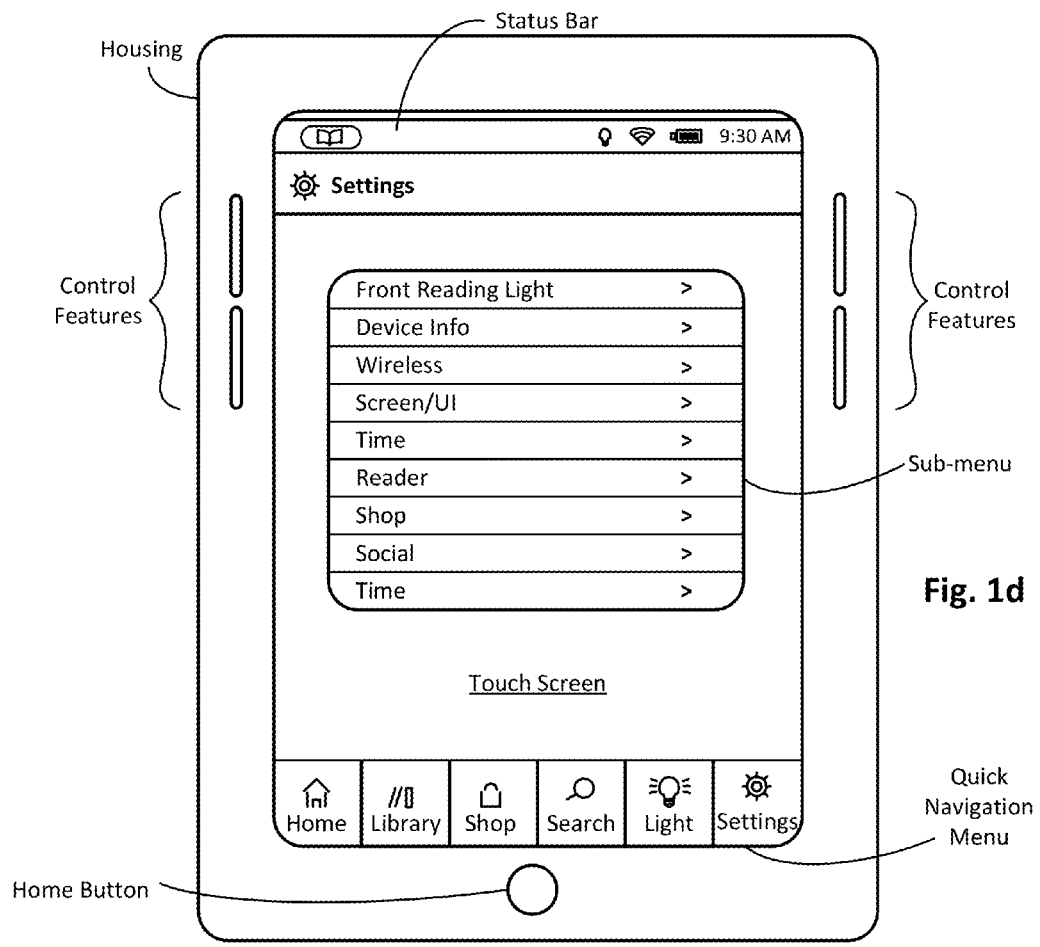
FIGS. 1d-e illustrate example configuration screen shots of the user interface of the electronic touch screen device shown in FIGS. 1a-b, configured in accordance with an embodiment of the present invention.
Figure 1E:
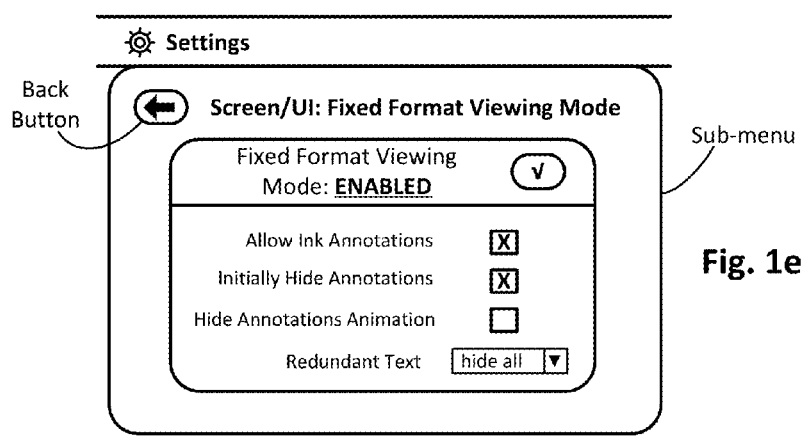

In one particular embodiment, a fixed format viewing mode configuration sub-menu, such as the one shown in FIG. 1e, may be accessed by selecting the Settings option in the quick navigation menu, which causes the device to display the general sub-menu shown in FIG. 1d. From this general sub-menu, the user can select any one of a number of options, including one designated Screen/UI in this specific example case. Selecting this sub-menu item may cause the configuration sub-menu of FIG. 1e to be displayed, in accordance with an embodiment. In other example embodiments, selecting the Screen/UI option may present the user with a number of additional sub-options, one of which may include a so-called "fixed format viewing mode" option, which may then be selected by the user so as to cause the fixed format viewing mode configuration sub-menu of FIG. 1e to be displayed. Any number of such menu schemes and nested hierarchies can be used, as will be appreciated in light of this disclosure. In other example embodiments, the fixed format viewing mode is hard-coded such that no configuration sub-menus are needed or otherwise provided (e.g., viewing pages containing virtual ink in a fixed format mode, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a contact in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch screen controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

In one example embodiment, a stylus input can be provided by placing the stylus tip on the stylus detection surface, or sufficiently close to the surface (e.g., hovering one to a few centimeters above the surface, or even farther, depending on the sensing technology deployed in the stylus detection surface) but nonetheless triggering a response at the device just as if direct contact were provided directly on a touch screen display. Once the device has detected the presence of the stylus, the device may calculate the location of the stylus above the surface of the device. As will be appreciated in light of this disclosure, a stylus as used herein may be implemented with any number of passive and/or active stylus technologies, such as a DUOSENSE® pen by N-TRIG® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid allows the device to, for example, only scan for a stylus input, a touch contact, to scan specific areas for specific input sources, or otherwise distinguish a stylus input from other touch screen inputs, in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location above the device, speed of movement, etc. Such an embodiment also eliminates the need for a battery on the stylus because the stylus is powered by the antenna coils of the device. In one particular example, the stylus sensor grid includes more than one set of antenna coils. In such an example, one set of antenna coils may be used to merely detect the presence of a stylus contact or a hovering or otherwise sufficiently proximate stylus, while another set of coils determines with more precision the stylus' location above the device.

As previously explained, and with further reference to FIGS. 1d and 1e, once the Settings sub-menu is displayed (FIG. 1d), the user can then select the Screen/UI option. In response to such a selection, the fixed format viewing mode configuration sub-menu shown in FIG. 1e can be provided to the user, in accordance with one such example embodiment. The user can configure a number of features with respect to the fixed format viewing mode, in this example case. For instance, the configuration sub-menu includes a UI check box that when checked or otherwise selected by the user, effectively enables the fixed format viewing mode (shown in the enabled state); unchecking the box disables the function. Other embodiments may have the fixed format viewing mode always enabled, or enabled by a physical switch or button located on the device, for example. In this embodiment, a number of options may be configured by the user with respect to the fixed format viewing mode using touch screen UI check boxes and drop down menus.

In this particular example, the user may enable or disable the ink annotations function, shown in the enabled state in this example. Disabling the ink annotations function may allow the user to hide and/or view any existing virtual ink annotations but will not allow additional annotations to be added. The configuration sub-menu may also include an option to make all annotations initially hidden when an eBook or other form of flowable digital content is opened, shown in the enabled state in this example. In some cases, an animation may be displayed when annotations are hidden and a fixed format page is reformatted into a flowable format. Such an animation may aid users in not losing their place while reading, and the animation is shown in the disabled state in this example. In some embodiments, the configuration sub-menu may allow the user to determine whether redundant text is visible, hidden, shaded out, or otherwise removed from the user's view. In this example, a drop down menu has selected that all redundant text be hidden. Other options that may be selected from the drop down menu may include, for example, shading out redundant text or covering redundant text with a page-curl graphic.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1e is presented merely as an example of how a fixed format viewing mode may be configured by the user, and numerous other configurable or hard-codable aspects will be apparent in light of this disclosure. Note that in some embodiments the fixed format viewing mode may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
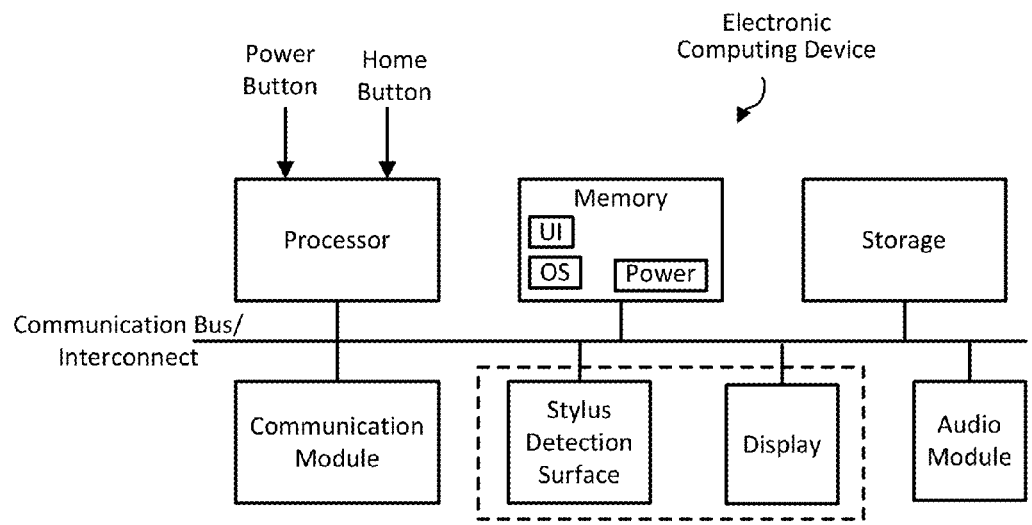
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a display, a stylus detection surface, and an audio module. A communications bus and interconnect is also provided to allow inter-device communication. Other typical componentry and functionality not reflected in the block diagram will be apparent (e.g., battery, co-processor, etc). Further note that in some embodiments the stylus detection surface may be integrated into the device display and the device display may be a touch sensitive display capable of detecting inputs from a user's hand, stylus, or other suitable implement. Alternatively, the stylus detection surface may include a track pad, a housing configured with one or more acoustic sensors, a separate stylus sensitive surface that may be connected to the device via cables or a wireless link, etc. As discussed above, the stylus detection surface may employ any suitable input detection technology that is capable of translating a stylus input into an electronic signal that can be manipulated or otherwise used to trigger a specific user interface action, such as those provided herein. The principles provided herein equally apply to any such touch sensitive devices. For ease of description, examples are provided with touch and stylus sensitive technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a fixed format viewing mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touch screen touch screen, or any other suitable display and touch screen interface technology. The communications module can be, for instance, any suitable 802.11b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop and desktop computer applications.

Figure 11:
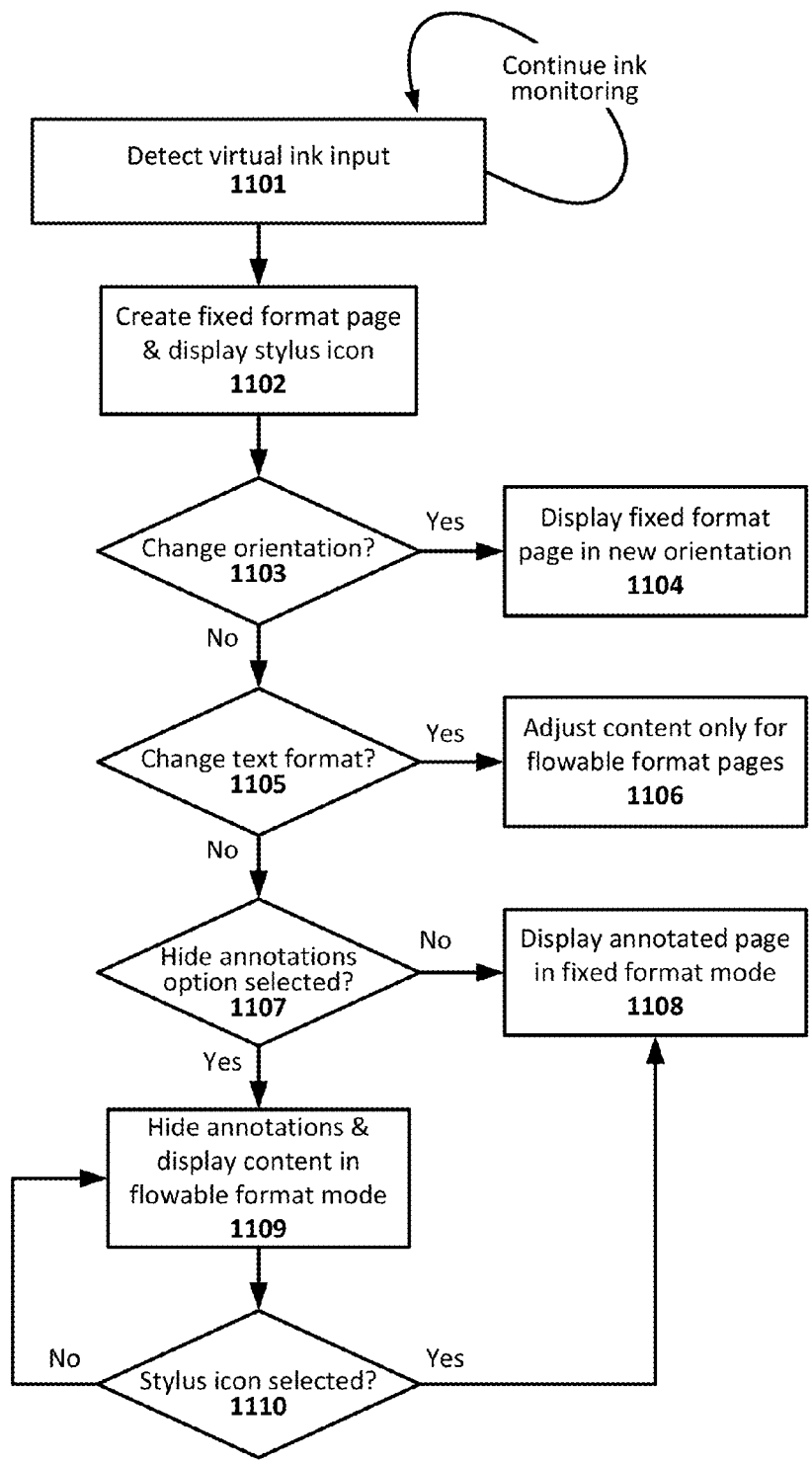
FIG. 11 illustrates a method for providing a fixed format viewing mode in an electronic touch screen device, in accordance with an embodiment of the present invention.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots and use-case scenarios shown in FIGS. 1a, 1d-e, 3a-d, 4a-b, 5a-d, 6, 7a-b, 8a-b, 9a-b, and 10a-d, and in conjunction with the fixed format viewing methodologies demonstrated in FIG. 11, which will be discussed in turn. The audio module can be configured to speak or otherwise aurally present, for example, a digital content sample, a selected eBook, or other textual content, and/or to provide verbal and/or other sound-based cues and prompts to guide the fixed format viewing mode, as will be appreciated in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Figure 2B:
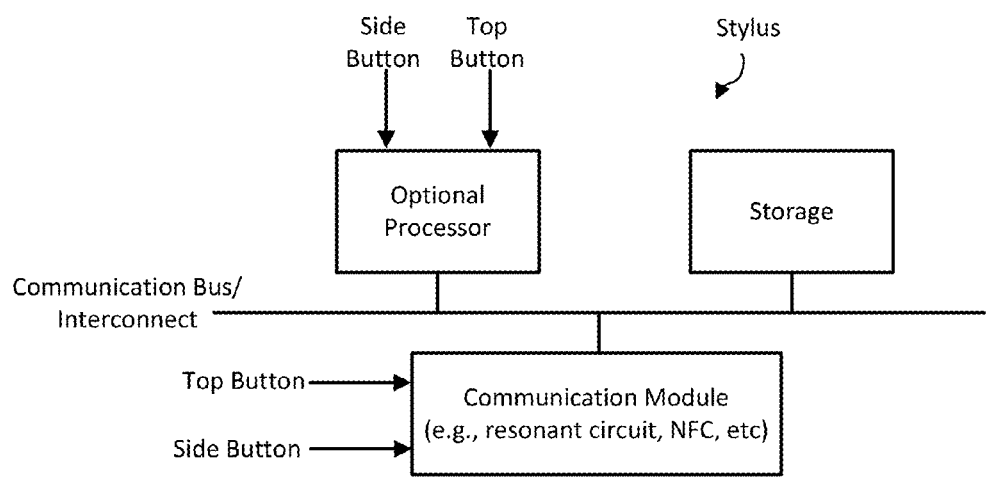
FIG. 2b illustrates a block diagram of a stylus configured in accordance with an embodiment of the present invention.

FIG. 2b illustrates a block diagram of a stylus configured in accordance with an embodiment of the present invention. As can be seen, this example stylus includes a storage/memory and a communication module. A communications bus and interconnect may be provided to allow inter-device communication. An optional processor may also be included in the stylus to provide local intelligence, but such is not necessary in embodiments where the electronic computing device with which the stylus is communicatively coupled provides the requisite control and direction. Other componentry and functionality not reflected in the block diagram will be apparent (e.g., battery, speaker, antenna, etc.). The optional processor can be any suitable processor and may be programmed or otherwise configured to assist in controlling the stylus, and may receive input from the user from control features including a top and side button. The storage may be implemented with any suitable memory and size (e.g., 2 to 4 GBytes of flash memory). In other example embodiments, storage/memory on the stylus itself may not be necessary.

The communications module can be, for instance, any suitable module which allows for connection to a nearby electronic device so that information may be passed between the device and the stylus. Example communication modules may include an NFC, Bluetooth, 802.11b/g/n WLAN, or other suitable chip or chip set which allows for connection to the electronic device. In other embodiments, the communication module of the stylus may implement EMR or other similar technologies that can communicate stylus information to a device, including stylus location, without a separate communications chip or chip set. In one such example, the stylus may include a communication module comprising a resonator circuit that effectively interacts with the device sensor grid. In such an example, the location of the stylus can be determined using an EMR digitizer loop architecture implemented in the stylus detection surface of the device. In a more general sense, an EMR detection grid on the stylus detection surface of the device may monitor the location of the stylus and trigger a response at the device. Note in such a case that a separate dedicated communication module on the electronic computing device and stylus may be optional.

As will be further appreciated, commands may be communicated and/or target content may be transferred between (e.g., copied or cut or pasted) the stylus and the electronic device over a communication link. In one embodiment, the stylus includes memory storage and a transceiver, but no dedicated processor. In such an embodiment, the processor of the electronic device communicates with the transceiver of the stylus and performs the various functions as indicated by the user.

Figure 2C:
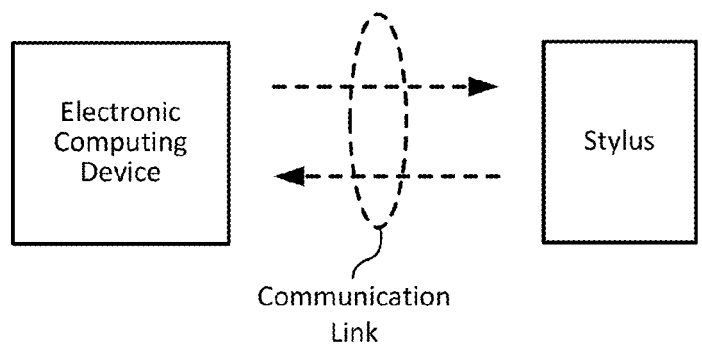
FIG. 2c illustrates a block diagram of a communication link between the electronic computing device of FIG. 2a and the stylus of FIG. 2b, configured in accordance with an embodiment of the present invention.

FIG. 2c illustrates a block diagram showing a communication link between the electronic computing device of FIG. 2a and the stylus of FIG. 2b, according to one embodiment of the present invention. As can be seen, the system generally includes an electronic computing device that is capable of wirelessly connecting to other devices and a stylus that is also capable of wirelessly connecting to other devices. In this example embodiment, the electronic computing device may be, for example, an e-Book reader, a mobile cell phone, a laptop, a tablet, desktop, or any other stylus sensitive computing device. As described above, the communication link may include an NFC, Bluetooth, 802.11b/g/n WLAN, electro-magnetic resonance, or other suitable communication link which allows for communication between one or more electronic devices and a stylus. In some embodiments EMR technology may be implemented along with one or more of NFC, Bluetooth, 802.11b/g/n WLAN, etc. In one such example, EMR may be used to power a stylus and track its location above a device, while NFC may enable data transfer between the stylus and the device. In some embodiments, the stylus may be configured and/or recalibrated in real-time over the communication link.

Client-Server System

Figure 2D:
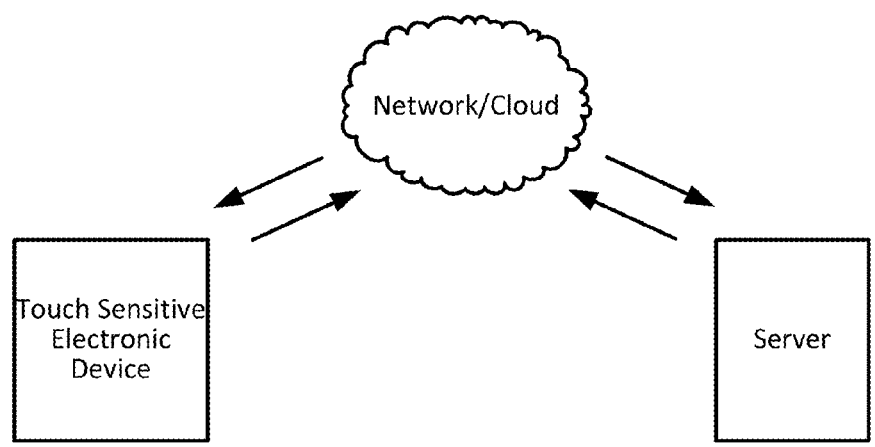
FIG. 2d illustrates a block diagram of a communication system including the electronic touch screen device of FIG. 2a, configured in accordance with an embodiment of the present invention.

FIG. 2d illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a fixed format viewing mode as provided herein to the touch screen device (e.g., via JavaScript or other browser based technology). In other embodiments, portions of the fixed format viewing methodology can be executed on the server and other portions of the methodology can be executed on the device. Numerous server-side/client-side execution schemes can be implemented to facilitate a fixed format viewing mode in accordance with an embodiment, as will be apparent in light of this disclosure.

Fixed Format Viewing Mode Examples

Figure 3A:
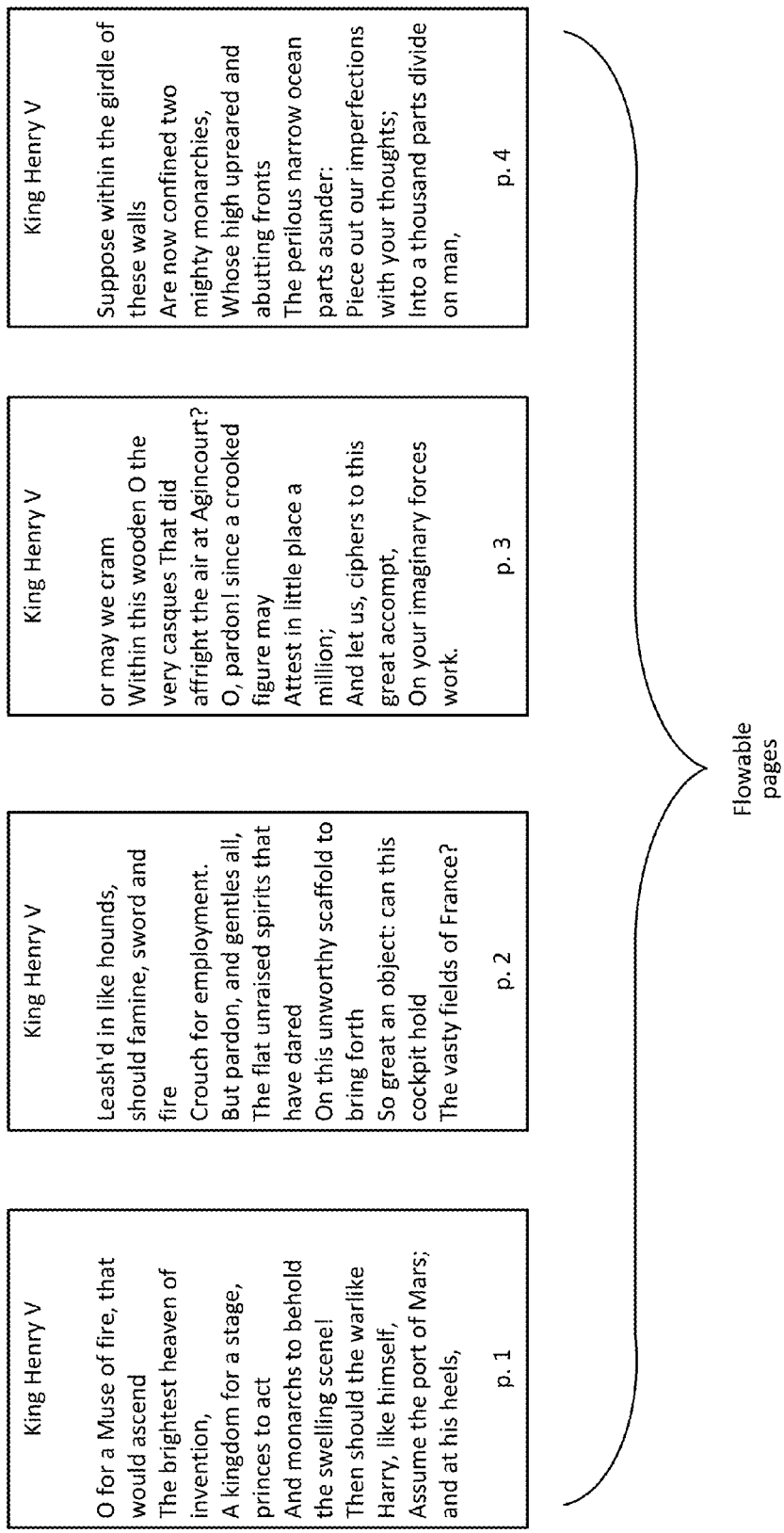
FIGS. 3a-d illustrate an example fixed format viewing mode of an electronic touch screen device, in accordance with an embodiment of the present invention.
Figure 3B:
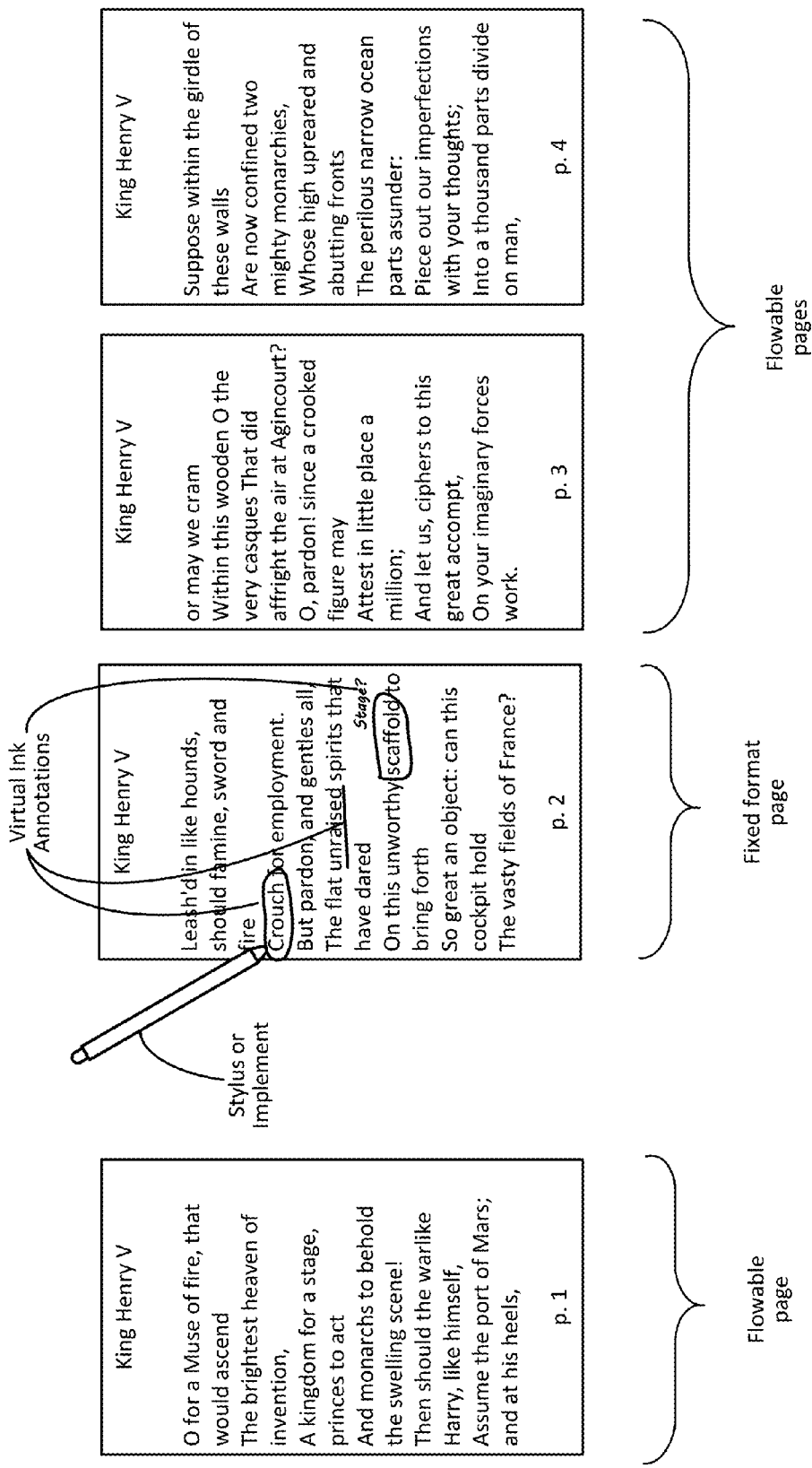
Figure 3C:
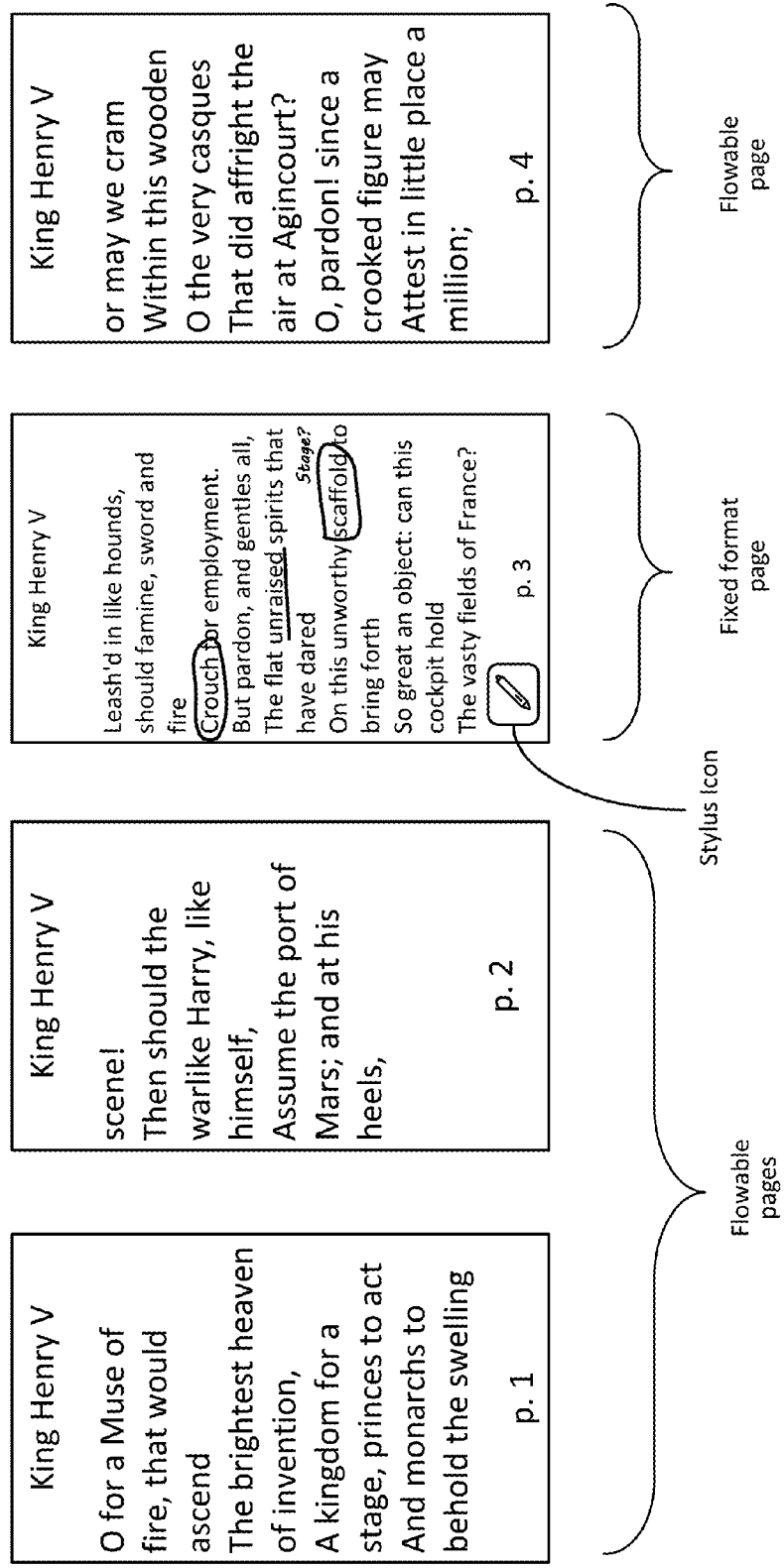
Figure 3D:
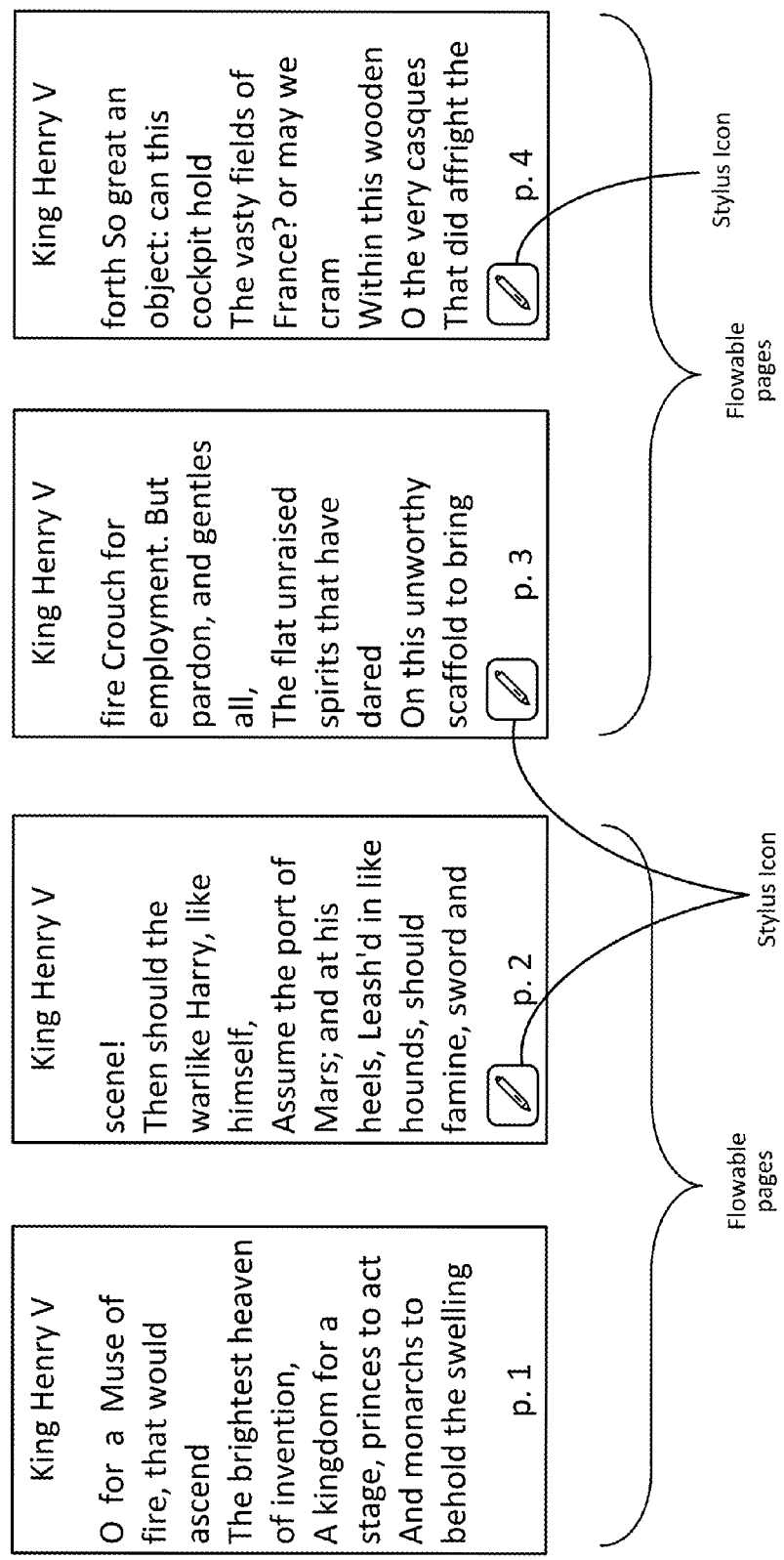

FIGS. 3a-d collectively illustrate an example fixed format viewing mode that can be applied to a touch sensitive display of an electronic device, in accordance with an embodiment of the present invention. As can be seen, FIG. 3a illustrates a span of four flowable format pages that may be displayed on a touch screen device, according to one embodiment. In this example, the first four pages of Henry V are displayed with their corresponding page numbers, each page having the same font, margins, etc. In FIG. 3b, the user creates virtual ink annotations on the second page of the eBook, causing page 2 to become a fixed format page including the ink annotations. Pages 1 and 3-4 remain in the standard flowable format. In the example shown in FIG. 3c, the user has increased the font size of the eBook text, causing the content that was on page 1 of FIG. 3b to be spread over pages 1 and 2 of FIG. 3c. However, page 2 from FIG. 3b is a fixed format page, so its font size is not increased and it is renumbered page 3 in FIG. 3c. The font size of the text following the fixed format page is increased as shown on page 4 of FIG. 3c. Referring to FIG. 3c, the text of page 2 does not cover the entire page because any further text would be redundant text included on pages 2 and 3. Page 3 includes virtual ink annotations, and also includes a stylus icon on the bottom left of the page, in this example. The stylus icon is a touch screen UI button with a stylus on it and functions to hide all virtual ink annotations, in this particular example. Pressing the stylus icon hides the annotations, and the text of the fixed format page may be adjusted to match the format of the rest of the eBook, as shown in FIG. 3d. The text of all pages in FIG. 3d has the same format, and any page with text associated with virtual ink may include a stylus icon, as shown on page 3, which when activated will display the fixed format page with inline virtual ink annotations and will renumber the pages as shown in FIG. 3c.

Figure 4A:
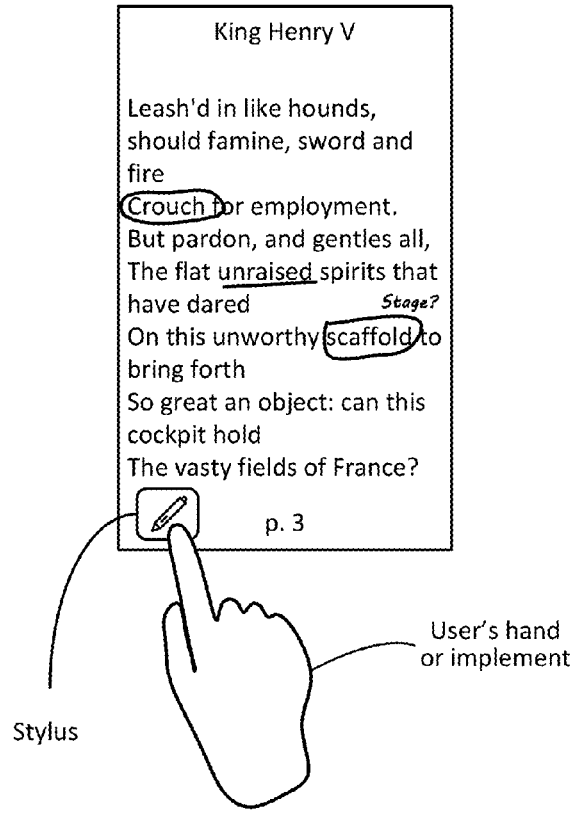
FIGS. 4a-b illustrate an example stylus touch screen UI feature that can be applied to a touch sensitive electronic device, in accordance with an embodiment of the present invention.
Figure 4B:
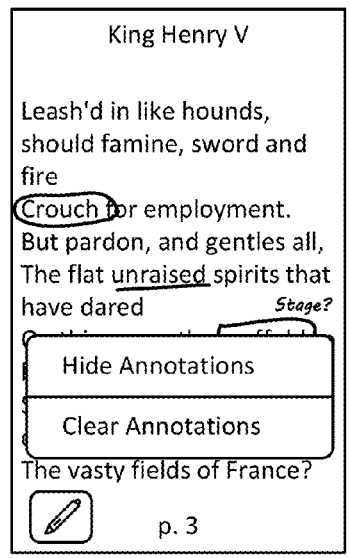

FIGS. 4a-b collectively illustrate an example stylus touch screen UI button that can be applied to a touch sensitive display of an electronic device, in accordance with an embodiment of the present invention. When viewing a fixed format page having virtual ink annotations, as shown in FIG. 4a, a stylus icon may be displayed, for example, at the bottom of the page. When the user selects this stylus icon, an option menu may pop up, as shown in the example in FIG. 4b, allowing the user to choose a function associated with the stylus icon. In this particular example, the user may select between hiding the annotations, and clearing the annotations. If the user is viewing a page with the virtual annotations hidden, one of the options may allow the user to display annotations, in one example. Other options relating to the virtual ink annotations may be included in the options menu for the stylus icon and the present invention is not intended to limit the stylus icon options to any particular set of functions.

Figure 5A:
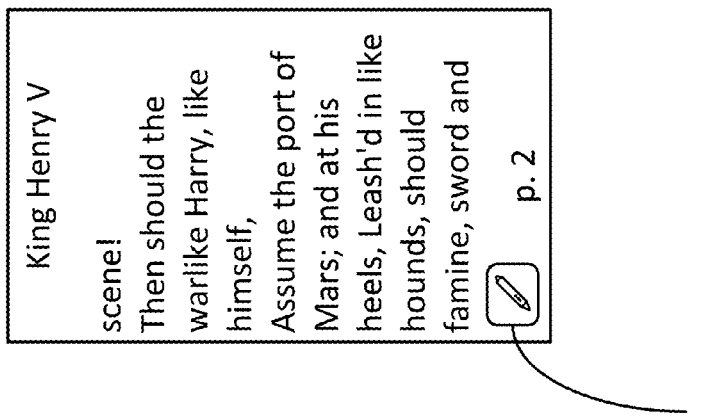
FIGS. 5a-d illustrate an example animation for hiding annotations and reformatting text of a fixed format page, in accordance with an embodiment of the present invention.
Figure 5B:
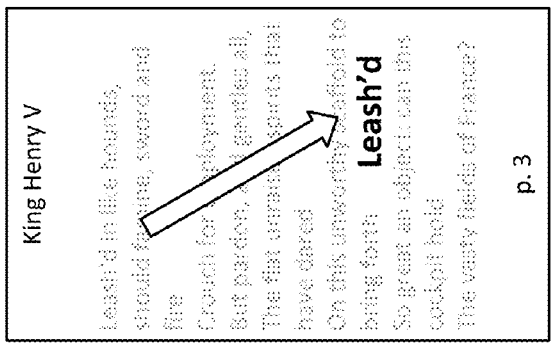
Figure 5C:
Figure 5D:
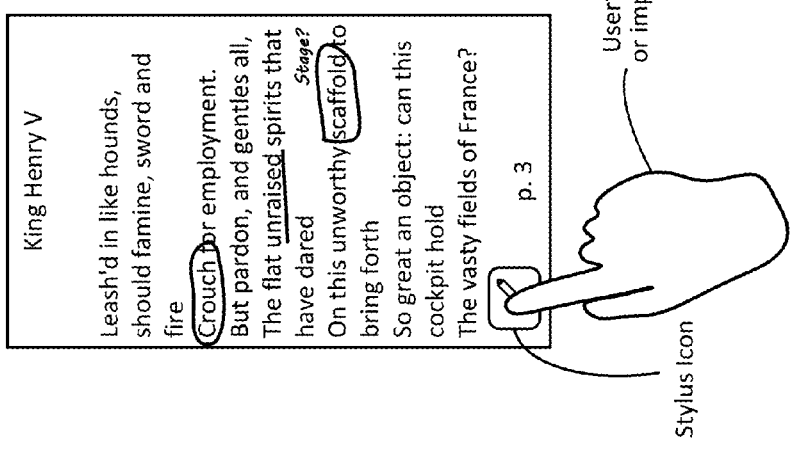

FIGS. 5a-d collectively illustrate an example animation for hiding annotations and reformatting text of a fixed format page, in accordance with an embodiment of the present invention. As can be seen, FIG. 5a shows a page including virtual ink annotations and a stylus icon that, when pressed, will hide the virtual ink annotations and reformat the text of the fixed format page into a flowable format matching the rest of the eBook. In this particular example, the rest of the eBook is in a larger font and an animation helps users not lose their spot while the annotations are hidden. When the stylus icon is pressed, in this example, the text font size is increased, the text is rearranged and the pages renumbered. As seen in the example of FIG. 5b, all but the first word of the fixed format page is faded out. FIG. 5c shows an example animation where the word relocates to its new position once the font is increased and the text is rearranged in a flowable format. Once the word is relocated on page 2, the rest of the text of page 2 may be displayed, as shown in FIG. 5d, along with a stylus icon.

Figure 6:
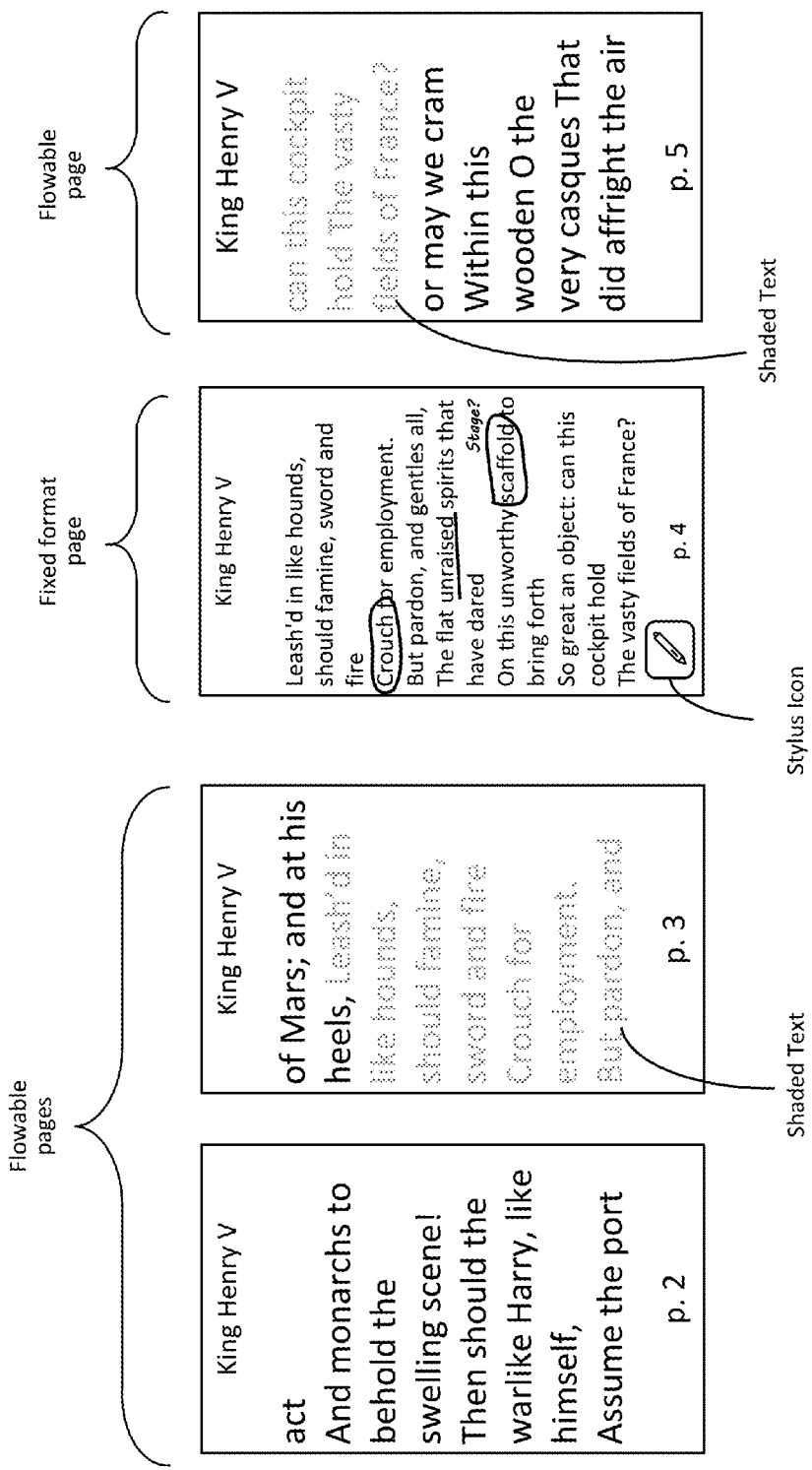
FIG. 6 illustrates an example fixed format viewing mode that can be applied to a touch sensitive electronic device, in accordance with an embodiment of the present invention.

FIG. 6 illustrates an example fixed format viewing mode that can be applied to a touch sensitive display of an electronic device, in accordance with an embodiment of the present invention. As can be seen, pages 2, 3, and 5 are flowable format pages, while page 4 is a fixed format page with virtual ink annotations and a stylus icon. The text of pages 2, 3, and 5 has been increased, and the redundant text on pages 3 and 5 has been shaded out so that, when reading page 3, the user knows to proceed to page 4 in order to view the shaded text along with the corresponding virtual ink annotations. Likewise, when the user is viewing page 5, the shaded text indicates what text was already presented on the previous fixed format page. In this particular embodiment, the text was shaded out, while in other cases the text may be completely invisible, as seen on page 2 of FIG. 3c.

Figure 7A:
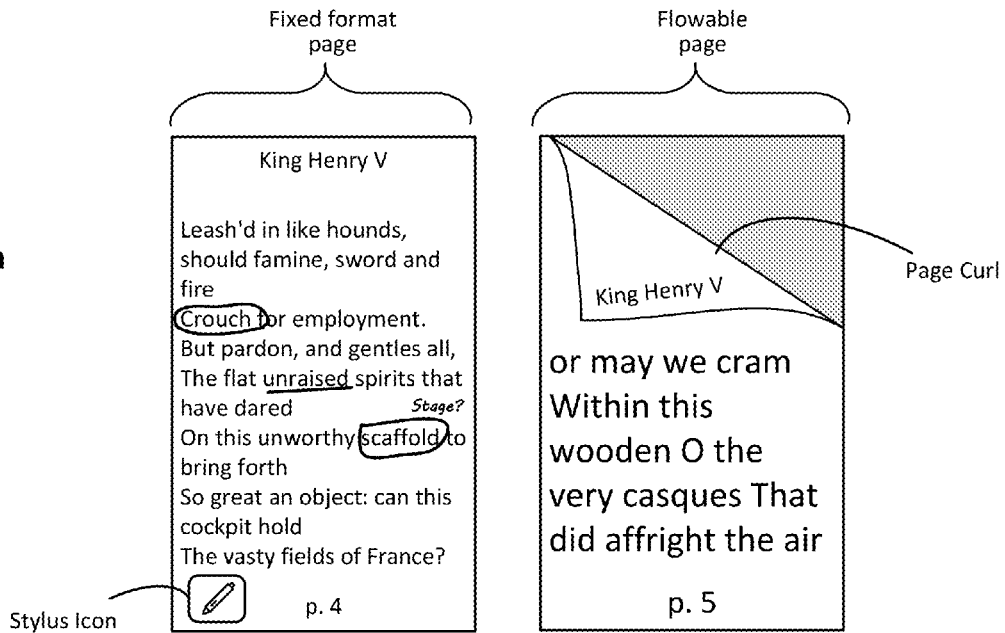
FIGS. 7a-b illustrate examples of page curl graphics covering redundant text, according to one embodiment of the present invention.
Figure 7B:
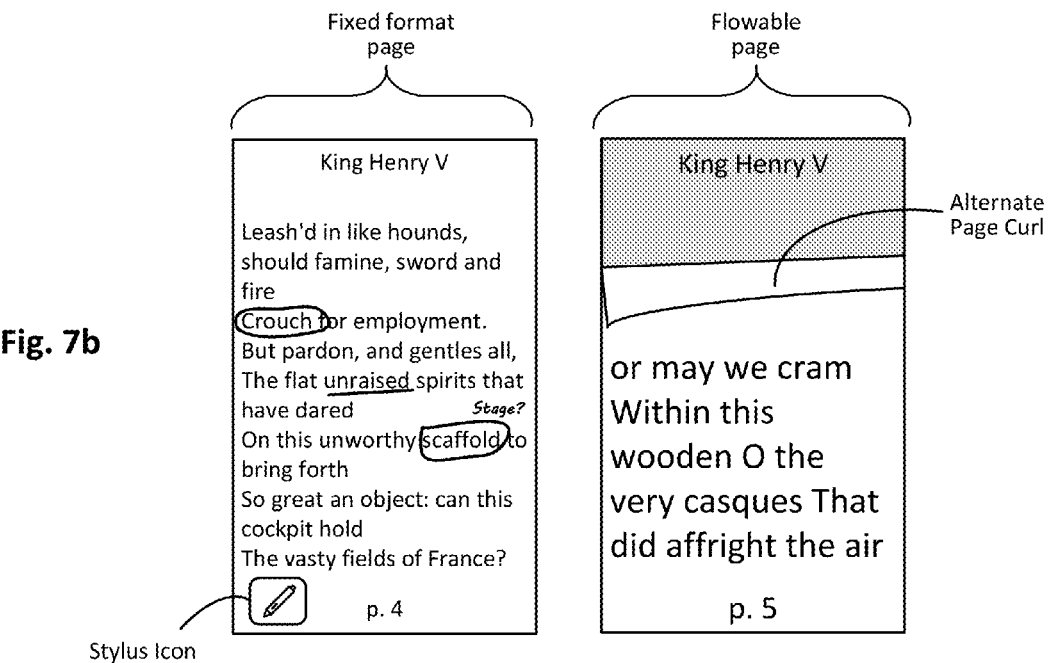

FIGS. 7a-b illustrate examples of page curl graphics covering redundant text, according to one embodiment of the present invention. As can be seen, page 4 of each figure is a fixed format page including virtual ink annotations and a stylus icon, while page 5 is a flowable format page with an increased font size and a page curl graphic covering the portion of the page that would contain redundant text. FIG. 7a shows an example page curl graphic that shows a virtual page folded away from the top right corner of the page, as if a virtual page binding existed along the left edge of the page. FIG. 7b, shows an alternate page curl graphic with the virtual page folded away from the top of the page.

FIGS. 8a-b illustrate an example fixed format viewing mode that can be applied to a touch sensitive display of an electronic device, in accordance with an embodiment of the present invention. As can be seen, FIG. 8a shows a page of an eBook in a fixed format viewing mode and containing virtual ink annotations. In this particular example, the user is viewing the eBook page in the portrait orientation. FIG. 8b shows an example of how the fixed format viewing mode may display a fixed format page when the device is rotated into the landscape orientation. In a flowable format mode, rotating the device into the landscape orientation may reflow the text to fill the screen or display the text in a double-column format. However, in some embodiments, the fixed format viewing mode maintains the margins, font size, and other formatting characteristics of the page and displays the fixed format page with larger margins on the sides, as shown in FIG. 8b. In such an example, a swipe gesture up or down may allow the user to view portions of the fixed format page not currently visible on the screen.

FIGS. 9a-b illustrate an example fixed format viewing mode that can be applied to a touch sensitive display of an electronic device, in accordance with an embodiment of the present invention. As can be seen, FIG. 8a shows a page of an eBook in a fixed format viewing mode and containing virtual ink annotations. In this particular example, the user is viewing the eBook page in the landscape orientation with the text divided into a two-column format. FIG. 9b shows an example of how the fixed format viewing mode may display a fixed format page when the device is rotated into the portrait orientation. In a flowable format mode, rotating the device into the portrait orientation may reflow the text to fill the screen or reformat the margins to show the text as a single column. However, in this example, the fixed format viewing mode maintains the same margins, font size, and other formatting characteristics and displays the fixed format page in the two-column format with the left column flush with the left edge of the page, as shown in FIG. 9b. In such an example, a sideways swipe gesture may allow the user to view portions of the fixed format page not currently visible on the screen.

FIGS. 10a-d illustrate two example fixed format viewing modes with extended margins that can be applied to a touch sensitive display of an electronic device, in accordance with an embodiment of the present invention. As can be seen, FIG. 10a shows an example eBook page in portrait orientation with extended margins and virtual ink annotations in the text and margins. In such an example, the fixed format page includes the extended margins and any annotations made in the margins. When the device orientation is rotated into the landscape mode, as shown in the example of FIG. 10b, the fixed format page may be reduced in size in order to show the whole page on the screen with the extended margins. In contrast to the example shown in FIG. 8b, the user does not need to swipe up or down in order to view all the text of the fixed format eBook page, in this particular example. FIG. 10c shows an example eBook page in landscape orientation with extended margins and virtual ink annotations in the text and margins. In such an example, the fixed format page includes the extended margins and any annotations made in the margins. When the device orientation is rotated into the landscape mode, as shown in the example of FIG. 10d, the fixed format page may be reduced in size in order to shown the whole page on with the extended margins in the portrait mode. In contrast to the example shown in FIG. 9b, the user does not need to use sideways swipe gestures in order to view all the text of the fixed format eBook page, in this particular example.

Methodology

FIG. 7 illustrates a method for providing a fixed format viewing mode in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the fixed format viewing mode can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to annotate content using an inking application, and to implement UI functionality, including a fixed format viewing mode as variously described herein, as will be appreciated in light of this disclosure.

In this example case, the method includes detecting 1101 a virtual ink input at the touch screen of an electronic device. The virtual ink input may be, for example, from an active stylus used to take notes on a device, and the input monitoring is effectively continuous. Once a virtual ink input is detected, the method may continue with creating 1102 a fixed format page and displaying the stylus icon on the page. The method may continue with determining 1103 whether there is a change in orientation of the device. If the orientation is changed, the method may continue with displaying 1104 the fixed format page in the new orientation. If the orientation of the device is not changed, the method may continue with determining 1105 if a change in text format is detected. Example text format changes may include adjusting the font, font size, margins, or any other formatting change that may alter the position of the text on the device screen. In one example, the text margins may be altered when digital content is transferred to another device having different screen dimensions. If a change in text format is detected, the method may continue with adjusting 1106 the digital content only for flowable format pages, in which case the fixed format page remains as it was when the virtual ink annotations were added. If no text format changes are detected, the method may continue with determining 1107 whether the hide annotations option is selected. In some embodiments, the hide annotations option may be selected from an options menu, or by selecting the stylus icon that may be displayed on the fixed format page or in an actions bar along with other eReader tools. If the hide annotations option is not selected, the method may continue with displaying 1108 the annotated page in the fixed format mode. If the hide annotations option is selected, the method may continue with hiding 1109 the virtual ink annotations and displaying content in the flowable format mode, consistent with the other pages of digital content. The method may continue with determining 1110 whether the stylus icon is selected. In one embodiment, the stylus icon is presented on every page containing text associated with virtual ink annotations, whether the annotations are hidden or not. If the stylus icon is selected, the method may continue with displaying 1108 the annotated page in the fixed format viewing mode. If the stylus icon is not selected, the method may continue hiding 1109 the annotations and displaying the content in the flowable format mode.

Numerous variations and embodiments will be apparent in light of this disclosure. One example embodiment of the present invention provides a device including a touch screen display for displaying digital content to a user and allowing user input. The device also includes a user interface including a fixed format viewing mode, wherein in response to a virtual ink annotation made on a current page via the touch screen display, the fixed format viewing mode is configured to convert the current page to a fixed format page, the fixed format page having fixed formatting characteristics and the virtual ink annotation remaining in its original position with respect to the digital content of the page, and wherein formatting characteristics of digital content not associated with the fixed format page remain changeable. In some cases, the virtual ink annotation is made on the touch screen display using an active stylus. In some cases, the formatting characteristics include at least one of: font, font size, line spacing, and/or margin spacing. In some cases, the digital content on pages adjacent to a fixed format page includes redundant text also included in the fixed format page, and the redundant text on the adjacent pages is shaded and/or hidden from view. In some cases, the digital content on pages adjacent to a fixed format page includes redundant text also included in the fixed format page, and the redundant text on the adjacent pages is covered by a page-curl graphic. In some cases, in response to receiving an indication that the virtual ink annotation of the fixed format page is to be hidden from the user, the fixed format page is hidden and a non-fixed format page is displayed without annotations and matching the formatting characteristics of the remainder of the digital content not associated with the fixed format page. In some such cases, an icon is displayed on any page containing virtual ink annotations, and selecting the icon causes an options menu to be presented including an option allowing the user to hide from view the virtual ink annotations. In other such cases, an animation is displayed upon hiding the virtual ink annotations, the animation showing a portion of the digital content relocating to a new position on the display. In other such cases, an icon is displayed on any page containing digital content relating to hidden virtual ink annotations, and selecting the icon causes an options menu to be presented including an option allowing the user to view the fixed format page with virtual ink annotations visible. In other such cases, hidden virtual ink annotations of a fixed format page are displayed to the user on that fixed format page in response to additional virtual ink annotations being received on that fixed format page via the touch screen display. In some cases, the formatting characteristics of digital content not associated with the fixed format page can be altered by receiving the digital content from a separate device having different screen dimensions than the touch screen display.

Another example embodiment of the present invention provides a mobile computing system including a processor and a touch screen display for displaying content to a user and allowing user input. The system also includes a user interface executable on the processor and including a fixed format viewing mode, wherein in response to a virtual ink annotation made on a current page via the touch screen display, the fixed format viewing mode is configured to convert the current page to a fixed format page, the fixed format page having fixed formatting characteristics and the virtual ink annotation remaining in its original position with respect to the digital content of the page, and wherein formatting characteristics of digital content not associated with the fixed format page remain changeable. In some cases, the virtual ink annotation is made on the touch screen display using a stylus. In some cases, the formatting characteristics include at least one of: font, font size, line spacing, and/or margin spacing. In some cases, the digital content on pages adjacent to a fixed format page include redundant text also included in the fixed format page, and the redundant text on the adjacent pages is shaded and/or hidden from view. In some cases, in response to receiving an indication that the virtual ink annotation of the fixed format page is to be hidden from the user, the fixed format page is hidden and a non-fixed format page is displayed without annotations and matching the formatting characteristics of the remainder of the digital content not associated with the fixed format page.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to display on the electronic device a current page of digital content, receive at the electronic device a virtual ink annotation on a current page, and convert the current page to a fixed format page having fixed formatting characteristics, the virtual ink annotation remaining in its original position with respect to the digital content of the page, and wherein formatting characteristics of digital content not associated with the fixed format page remain changeable. In some cases, the virtual ink annotation is received via a stylus and the process is further configured to display on the electronic device a stylus icon control feature, receive at the electronic device selection of the stylus icon, hide from view the virtual ink annotation, adjust the formatting characteristics of the digital content of the fixed format page to match formatting characteristics of the remainder of the digital content while the annotation is hidden, receive at the electronic device a subsequent selection of the stylus icon, and revert the current page to the fixed format page having the virtual ink annotation in its original position with respect to the digital content of the page. In some such cases, hiding from view the virtual ink annotation further includes displaying an animation, the animation showing a portion of the digital content relocating to a new position on the device screen. In some cases, the formatting characteristics include at least one of: font, font size, line spacing, and/or margin spacing.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
a touch screen display for displaying paginated digital content to a user and allowing user input; and
a user interface including a fixed format viewing mode, wherein a given page of the paginated digital content is displayed in a first format and in response to an annotation provided on the given page of the paginated digital content, content of the given page becomes fixed in the first format, such that if the paginated digital content is reflowed to a second format, the content of the given page stays fixed in the first format and does not reflow to the second format, and content of at least one other page of the paginated digital content having no annotation is reflowed to the second format;
wherein in response to a hide annotations action, the annotation is hidden and the fixed format viewing mode is configured to display the content of the given page in the second format; and
wherein the mode is further configured to display the content of the given page in the first format and with the annotation in response to one of an additional annotation provided on the paginated digital content and a show annotations action.

2. The device of claim 1 wherein a reflow of the paginated digital content is performed in response to a change to at least one of a content viewing setting and a formatting characteristic of the paginated digital content.

3. The device of claim 2 wherein a change to a formatting characteristic of the paginated digital content includes a change to at least one of font, font size, line spacing, and margin spacing.

4. The device of claim 1 wherein in response to a reflow of the paginated digital content, content on at least one page adjacent to the given page includes redundant content also included on the given page, and wherein the redundant content on the at least one adjacent page is visually different from non-redundant content.

5. The device of claim 4 wherein the redundant content on the at least one adjacent page is shaded to be visually different from the non-redundant content.

6. The device of claim 1 wherein in response to the hide annotations action, the fixed format viewing mode is configured to hide all notes, highlights, bookmarks, and annotations for the given page of the paginated digital content.

7. The device of claim 1 wherein an icon is displayed on any page containing at least one annotation, and wherein the hide annotations action includes selecting the icon to present an options menu including an option allowing the user to hide from view the annotation.

8. The device of claim 1 wherein an animation is displayed upon hiding the annotation, the animation showing a portion of the paginated digital content relocating to a new position on the display.

9. The device of claim 1 wherein an icon is displayed on a page containing a hidden annotation, and wherein the show annotations action includes selecting the icon to present an options menu including an option allowing the user to view such a page with the annotation visible.

10. The device of claim 1 wherein the mode is configured to display the content of the given page in the first format and with the annotation in response to an additional annotation provided on the given page.

11. The device of claim 1 wherein the content of the given page fixed in the first format is not tied to a specific page number, such that a page number associated with the given page can be updated in response to a reflow of the paginated digital content to the second format.

12. A mobile computing system, comprising:
a processor;
a touch screen display for displaying paginated digital content to a user and allowing user input; and
a user interface executable on the processor and including a fixed format viewing mode, wherein in response to an annotation provided on a given page of the paginated digital content, content of the given page becomes fixed, such that if the paginated digital content is reflowed, the content of the given page stays fixed and does not reflow, and content of at least one other page of the paginated digital content having no annotation is changed;
wherein a reflow of the paginated digital content is performed in response to a change to at least one of a content viewing setting and a formatting characteristic of the paginated digital content; and
wherein in response to the reflow of the paginated digital content, content on at least one page adjacent to the given page includes redundant content also included on the given page, and wherein the redundant content on the at least one adjacent page is visually different from non-redundant content.

13. The system of claim 12 wherein an annotation can only be made on the touch screen display using a stylus.

14. The system of claim 12 wherein a change to a formatting characteristic of the paginated digital content includes a change to at least one of font, font size, line spacing, and margin spacing.

15. The system of claim 12 wherein in response to the annotation provided on the given page of the paginated digital content, the content of the given page becomes fixed in a first format, such that if the paginated digital content is reflowed to a second format, the content of the given page stays fixed in the first format and does not reflow to the second format, and the content of at least one other page of the paginated digital content having no annotation is reflowed to the second format.

16. The system of claim 12 wherein in response to receiving an indication that the annotation of the given page is to be hidden from the user, the content of the given page reflows.

17. A non-transitory computer program product comprising a plurality of instructions encoded thereon that when executed by one or more processors cause a process to be carried out, the process comprising:
display on an electronic device a given page of paginated digital content;
receive at the electronic device an annotation on the given page; and
convert the given page to a fixed format page in a first format wherein content of the given page becomes fixed, such that if the paginated digital content is reflowed to a second format, the content of the given page stays fixed in the first format and does not reflow to the second format, and content of at least one other page of the paginated digital content having no annotation is reflowed to the second format;
in response to a hide annotations action, hide the annotation and display the content of the given page in the second format; and
in response to one of an additional annotation provided on the paginated digital content and a show annotations action, display the content of the given page in the first format and with the annotation.

18. The computer program product of claim 17 wherein the annotation is received via a stylus, the process further comprising:
display on the electronic device a stylus icon control feature;
receive at the electronic device selection of the stylus icon;
hide from view the annotation; and
adjust the formatting characteristics of the content of the given page to match formatting characteristics of the remainder of the paginated digital content while the annotation is hidden.

19. The computer program product of claim 18 wherein hiding from view the annotation further comprises displaying an animation, the animation showing a portion of the paginated digital content relocating to a new position on the device screen.

20. The computer program product of claim 17 wherein the content of the given page fixed in the first format is not tied to a specific page number, such that a page number associated with the given page can be updated in response to a reflow of the paginated digital content to the second format.

* * * * *